No. 714,527. Patented Nov. 25, 1902.
E. C. SMITH.
FERTILIZER DISTRIBUTER.
(Application filed Apr. 29, 1902.)
(No Model.) 3 Sheets—Sheet 1.
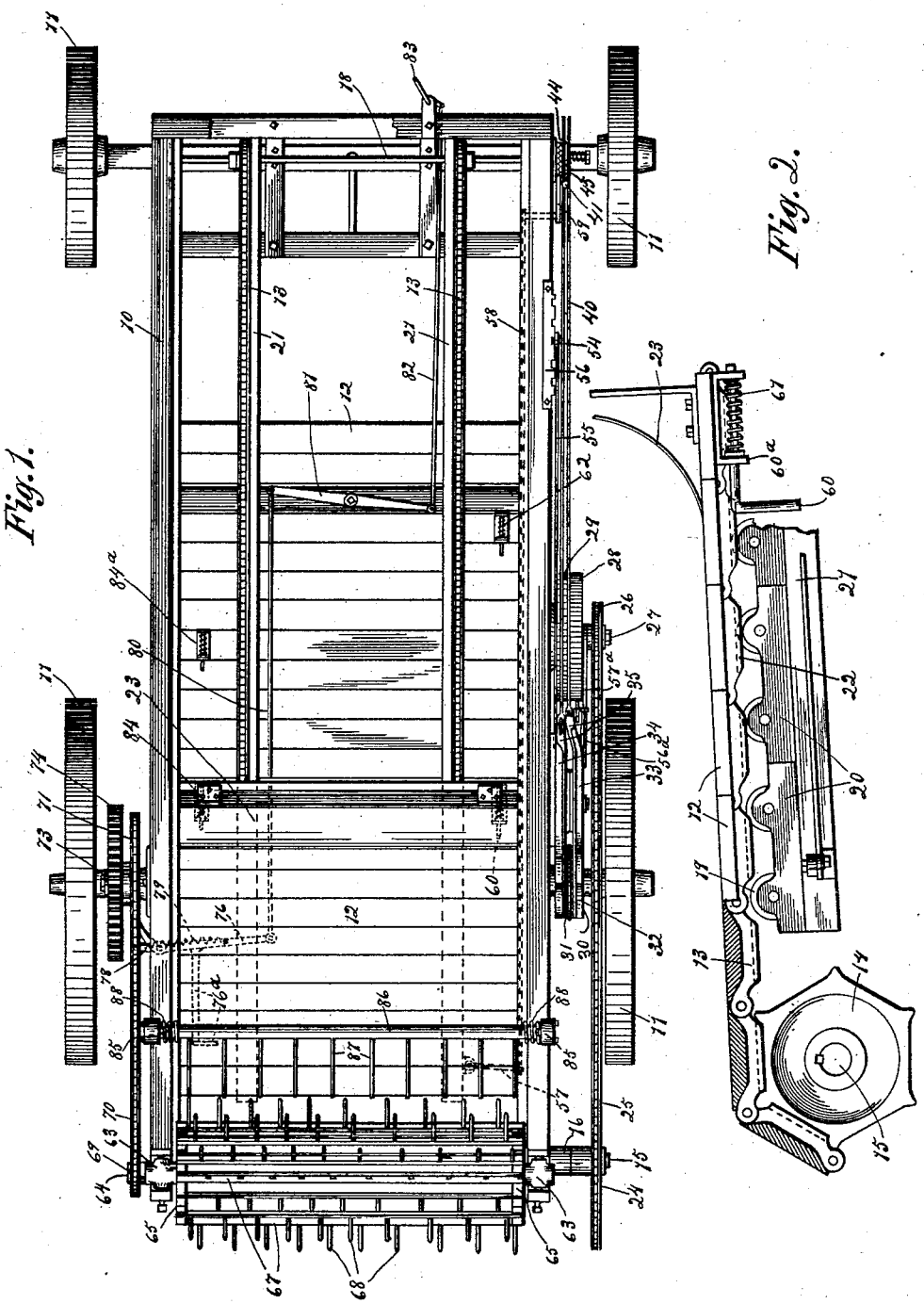
WITNESSES:
W. H. Cotton.
Arthur B. Seibold.
INVENTOR.
Ernest C. Smith.
BY
Louis K. Gibson
ATTORNEY.

No. 714,527. Patented Nov. 25, 1902.
E. C. SMITH.
FERTILIZER DISTRIBUTER.
(Application filed Apr. 29, 1902.)
(No Model.) 3 Sheets—Sheet 2.
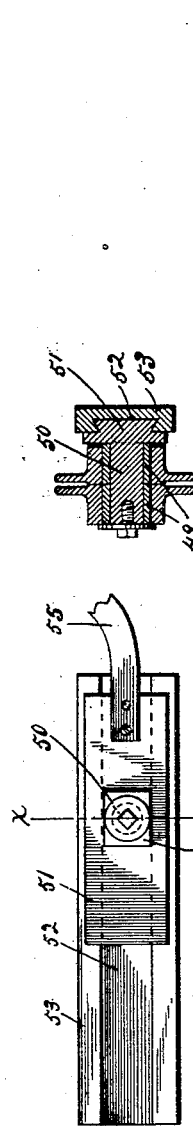
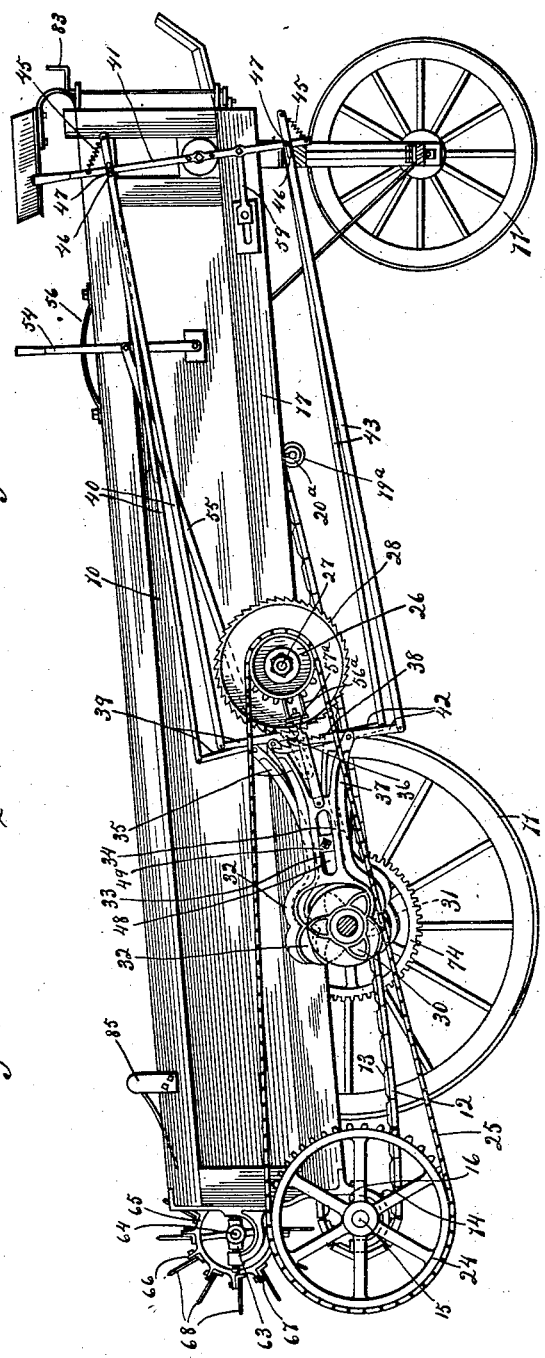
WITNESSES:
W. H. Cotton.
INVENTOR.
Ernest C. Smith.
BY
ATTORNEY.
THE NORRIS PETERS CO., PHOTO-LITHO., WASHINGTON, D. C.

No. 714,527. Patented Nov. 25, 1902.
E. C. SMITH.
FERTILIZER DISTRIBUTER.
(Application filed Apr. 29, 1902.)
(No Model.) 3 Sheets—Sheet 3.
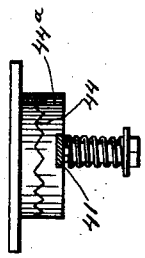
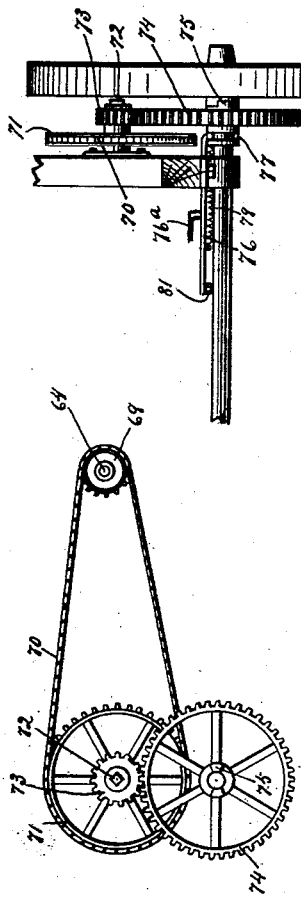
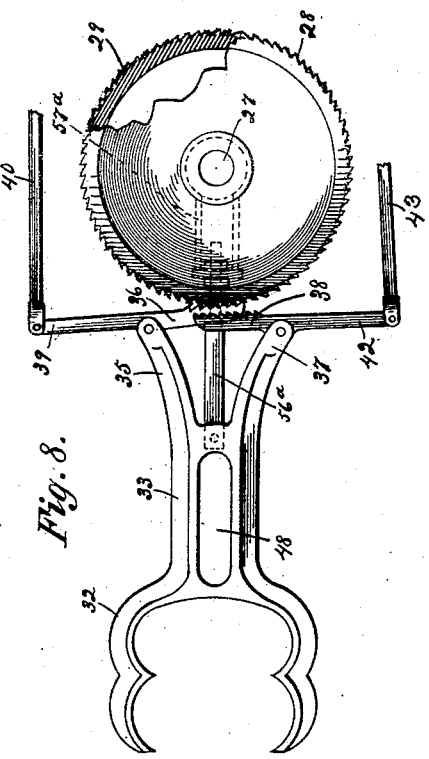
WITNESSES:
W. H. Cotton.
INVENTOR.
Ernest C. Smith.
BY
ATTORNEY.

UNITED STATES PATENT OFFICE.

ERNEST C. SMITH, OF HINCKLEY, ILLINOIS.

FERTILIZER-DISTRIBUTER.

SPECIFICATION forming part of Letters Patent No. 714,527, dated November 25, 1902.

Application filed April 29, 1902. Serial No. 105,240. (No model.)

*To all whom it may concern:*

Be it known that I, ERNEST C. SMITH, a citizen of the United States, and a resident of Hinckley, county of Dekalb, and State of Illinois, have invented certain new and useful Improvements in Fertilizer-Distributers, of which the following is a specification, and which are illustrated in the accompanying drawings, forming a part thereof.

This invention relates to a fertilizer-distributer of that type in which the fertilizer is fed by a traveling apron or conveyer from a suitable hopper or body mounted upon wheels to a distributing mechanism, by which the fertilizer is disintegrated and scattered over the ground.

The invention consists in the arrangement and combination of parts hereinafter particularly described, specifically designated in the claims, and which are illustrated in the accompanying drawings, in which—

Figure 1 is a plan of the fertilizer-distributer. Fig. 2 is a longitudinal section of a portion of the traveling apron or conveyer. Fig. 3 is a side elevation of the fertilizer-distributer, one of the rear carrying-wheels thereof being removed in order to more clearly show the mechanism for communicating motion from the running-gear on which the hopper or body is mounted to the traveling apron or conveyer. Fig. 4 relates to a detail of the means for changing the throw of the levers through the medium of which the apron is driven in order to vary the speed of the latter. Fig. 5 is a section on the line $x$ $x$ of Fig. 4. Fig. 6 is a side elevation of the gearing for driving the distributing drum or roll. Fig. 7 is a rear elevation of the same. Fig. 8 illustrates one of the levers and its pawls for transmitting motion from the running-gear to the mechanism for driving the apron or conveyer, a portion of the outer ratchet-wheel being broken away to show the inner ratchet-wheel; and Fig. 9 shows a clutch which is designed to hold against movement the mechanism for shifting the pawls carried by the levers shown in Fig. 8.

The hopper or body 10, designed to contain the fertilizer, may be similar in construction to the body of an ordinary farm-wagon, although without the usual bottom, and is mounted in any suitable manner on carrying-wheels 11. The bottom of the body 10 comprises a slatted apron or conveyer 12, movable longitudinally with reference thereto and somewhat longer than the said body and driven in the manner to be hereinafter explained.

The slats of the apron 12 are fastened to endless chains 13, passing over sprocket-wheels 14, keyed to a transverse shaft 15, located at the rear of the body or hopper and under the open delivery end thereof and journaled in bearings 16, secured to the side beams 17, and at the front end over sprocket-wheels fixed to a transverse shaft 18. The upper stretches of the chains 13 are supported by rollers 19, journaled in castings 20, let into the upper faces of the central longitudinal beams 21, located under the hopper or body 10, and the links of the chains are provided with parallel flanges or leaves 22, which pass along the opposite sides of the rollers 19 and serve to keep the chains on the rollers. (See Fig. 2.) The under stretches of the chains are supported by an idler $19^a$, carried in hangers $20^a$, secured to the side beams 17.

Secured to the front end of the conveyer is a follower or head block 23, which in the operation of the machine is designed to move with the apron from one end of the hopper or body to the other to prevent the fertilizer from falling over the front end of the apron.

The shaft 15 has fixed thereto a sprocket-wheel 24, to which motion is communicated by a chain 25, driven by a sprocket 26, mounted on a stub-shaft 27, supported from the side of the hopper and in the construction illustrated, Fig. 3, located in front of the rear carrying-wheels 11. This sprocket-wheel 26 is designed to be driven in opposite directions in order to move the apron into and out of the hopper, and such motion is communicated thereto through the medium of a pair of ratchet-wheels 28 29, fixed to the sprocket-wheel, and the teeth of which are inclined in opposite directions. Motion is communicated to these ratchet-wheels through the medium of mechanism driven by one of the rear carrying-wheels, and to this end the hub of the said wheel has secured thereto side by side a pair of cams 30 31, rotating between the arms of yokes 32, formed at the end of each of a pair of parallel levers 33 34, which are pivotally supported from the body 10 and each of which is provided with a pair of forwardly-extending arms having pivoted thereto pawls adapted to engage the ratchet-wheels, as shown in Figs. 3 and 8.

The upper arm 35 of the lever 33 is bent inwardly, so that the pawl 36, carried thereby, as well as the pawl 36 of the upper arm of the lever 34, will engage the inner ratchet-wheel or 29, and the lower arms or 37 are provided with pawls 38, which are disposed side by side and are adapted to engage and drive the outer ratchet-wheel or 28. The sets of pawls carried, respectively, by the upper and lower arms of the levers are designed to be thrown, through the medium of mechanism hereinafter described, alternately into engagement with the ratchet-wheels, so as to drive the sprocket 26 in either direction.

The cams 30 31 may be of any suitable form, those shown being three-pointed or star-shaped and so disposed that the points of one cam alternate with those of the other in order that the vibratory movement imparted to the levers 33 34 may be non-synchronous, whereby a practically continuous movement is given the apron—that is to say, assuming that the upper pawls 36 are actuating their companion ratchet-wheel one of the said pawls will be turning the said ratchet-wheel while the other is running back over the teeth thereof.

The upper pawls are provided with upwardly-extending arms 39, to which is jointed a rod or, as shown, a pair of rods 40, connected to a lever 41, located near the driver's seat, and the lower pawls are provided with downwardly-extending arms 42, which are jointed to rods 43, similar to the rods 40, and connected to the lower end of the lever 41, as shown in Fig. 3, the pivotal point of said lever being medial of the rods attached thereto.

It will be understood from the foregoing that if the lever 41 be moved forward the upper set of pawls or 36 will, through the medium of the connecting-rods 40, be thrown out of engagement with the inner ratchet-wheel 29, and the lower set of pawls or 38 simultaneously moved into engagement with the ratchet-wheel 28, and the reverse movement of the said lever will have the opposite effect. When the lever is moved to a central position, both sets of pawls are thrown out of engagement with the ratchet-wheels, and it is held in any position to which it may be thrown by means of a ratchet-clutch 44, to a spring-pressed member 44ᵃ of which the said lever is secured.

Springs 45 are connected to the rods 40 and 43 at one end and at the other to the lever 41, and each pair of the said rods has a movement longitudinally with reference to the lever, to provide for which each of the rods has a slot 46, in which is located the end of a pin 47, passing through the lever. By this arrangement each pair of pawls when actively engaging its companion ratchet-wheel will be forced by the spring 45, connected to the rods leading therefrom to the lever 41, into engagement with the teeth of said ratchet-wheel.

In order to vary the throw of the pawls 36 38, and thereby increase or decrease the rate of travel of the apron or conveyer 12, means are provided for changing the pivot-point of the levers. This is accomplished, Figs. 3, 4, and 5, by forming the levers 33 34 with parallel longitudinal slots 48, in which are designed to be moved oscillating blocks 49, mounted on a pin 50, projecting from a slide 51, movable in a longitudinal way 52 of a plate 53, secured to the under side of the side beam 17, adjacent thereto. The slide 51 is shifted by a lever 54, to which it is connected by a rod 55, the lever engaging and being held by a ratchet-plate 56, secured to the wagon-body.

The levers are held in right relation with the ratchet-wheels 28 29 by means of tie-bars 56ᵃ, pivotally connected at one end to the said levers and at the other to yokes 57ᵃ, loosely seated in grooves in the hub of the ratchet-wheel.

In order to arrest the movement of the apron 12 upon the discharge of the fertilizer carried thereby, so as to prevent the head-block 23 being carried against the distributing-drum, hereinafter described, in case the lever 41 is not operated, a tripping mechanism is provided and designed to automatically throw out of operation the mechanism for driving the apron. To this end an arm 57 is pivoted between the upper and lower stretches of the chains 13 to one of the beams 21 and connected by a rod 58 (shown in dotted lines, Fig. 1) to an arm 59, jointed to the lever 41. Carried at the front end of the apron on the inner face of the same and near the head-block 23 and so disposed as to coact with the arm 57 is a tripping device or finger 60. This finger 60 is preferably slidably mounted in a hanger 60ᵃ and is moved against the reaction of a spring 61, so as to prevent a sudden impact or shock when the lever-arm 57 is engaged thereby. A similar tripping device 62 is located at the opposite end of the apron and is designed to bring the apron to a state of rest when the latter is moved in the opposite direction or drawn into the wagon after having discharged a load of fertilizer. When either of the trips 60 or 62 engages the arm 57, the lever 41 through the medium of the rod 58 is shifted to a central position, thereby throwing out of action the set of pawls transmitting motion to the apron-driving mechanism and which will depend on the direction of movement of the apron.

Located at the rear end of the body over the discharge end of the apron 12 and parallel to the shaft 15 and journaled in suitable hangers 63 is a shaft 64, having fixed thereto at opposite ends heads or webs 65, provided with radial lugs 66, bolted to which are angle-bars 67, connecting the said webs or heads. These angle-bars have secured thereto in any suitable manner pickers or fingers 68 for disintegrating and scattering the fertilizer and constitute with the shaft, heads, and angle-bars the distributing roll or drum.

Motion is imparted to the distributing-drum through the medium of a sprocket-wheel 69, which is keyed to the shaft 64 at the end opposite to that adjacent to which is located the mechanism for driving the apron. (Shown in Figs. 1, 6, and 7.) The sprocket 69 is driven through the medium of a chain 70, passing around a sprocket-wheel 71, journaled on a stub-shaft 72 and having fixed thereto a pinion 73, which meshes with and is driven by a gear 74, slidably mounted on the rear axle of the running-gear and carrying a member of a clutch 75, the other member whereof is attached to the hub of the rear carrying-wheel adjacent thereto.

Pivoted to one of the longitudinal beams 17 is a bell-crank lever 76, one of the arms of which is provided with a yoke 77, engaging an annular groove in the hub of the gear 74. Secured to the body 10 is an extension 78, having attached thereto one end of a retractile spring 79, the other end of which is connected to the lever 76 at the opposite side of the pivot of the said lever, the function of the said spring being to throw the lever 76 quickly in either direction after it passes the pivot-point and also to hold the same when thrown.

Any suitable connection may be provided for manually operating the clutch 75. In the drawings I have shown a rod 80 connected to the lever and to one end of a medially-pivoted lever 81, to the other end of which is connected a rod 82, operated by a crank-arm 83, located near the driver's seat.

In order to automatically throw the distributing-roller out of operation as soon as the load has been discharged, I provide a trip 84, similar to the trips 60 and 62, and which is so disposed on the apron 12 that as soon as the load has been completely discharged an arm 76$^a$ of the lever 76 will be engaged by the trip and shift the said lever so as to uncouple the clutch 75, and a similar trip 84$^a$ is located at the opposite end of the apron and designed to automatically couple the clutch 75 to throw the distributer into action again.

Pivoted in brackets 85, secured to the upper edges of the sides of the hopper, is a cross-bar 86, provided with fingers 87, projecting toward the outlet of the hopper. These fingers are designed to press against and pack the fertilizer being delivered by the apron to the distributer, and in order to more effectually accomplish this result springs 88 are provided and so arranged as to put the bar 86 under pressure, thereby forcing the fingers downwardly against the fertilizer.

The operation is as follows: While the apron 12 is discharging the pawls 36 are in active engagement with the inner ratchet-wheel or 29, the lever 41 having been thrown to the position illustrated in Fig. 3, and the distributing-drum having been thrown into action manually or automatically, as hereinafter explained, the fertilizer as it is slowly fed to the distributing-drum is disintegrated by the fingers 68 and scattered over the land. When the head-block 23 reaches a point near the distributer or when all of the fertilizer has been discharged by the apron, the lever 57 57 is engaged by the trip 60, thereby throwing the lever 41 by means of the connecting-rod 58 to a central position, disengaging through the medium of the rods 40 the pawls 36 from the ratchet-wheel 29 and arresting the movement of the apron. Simultaneously with this action the lever 76 is moved by the trip 84 to uncouple the clutch 75, so that the movement of the distributing-drum will likewise be discontinued. The lever 41 is next manually shifted to its other position—that is to say, is thrown forward—bringing the pawls 38 into engagement with the outer ratchet-wheel or 28 in order that when the fertilizer-distributer is returning for a new load a reverse movement may be imparted to the shaft 27, so as to draw the apron into the hopper or body again. As soon as the apron has nearly reached the limit of its forward movement—say about three inches from the front end of the hopper—it is stopped manually by shifting the lever 41, throwing out the active pawls 38. The hopper having been recharged, when the field being treated is reached the lever 41 is first moved forward, so as to throw the pawls 38 into action and whereby the apron will be drawn still farther into the hopper, backing the load away from the distributing-drum. The trip 84$^a$ is so located that just before the apron reaches its extreme forward position it engages the arm 76, coupling the clutch 75 and throwing the distributing-drum into action, and at the same time or shortly after the trip 62 engages the lever 57, and the movement of the apron is discontinued. The lever 41 is next shifted to discharge the load. By this arrangement and operation the drum may be put into action free of the load and allowed to attain full speed before the fertilizer reaches it, thereby avoiding danger of clogging and consequent breakage of the mechanism. Of course, if desired, the movement of the belt and also the distributer may be manually controlled by means of the crank 83 and the lever 41. If it be desired to change the speed of the apron, the lever 54 is shifted so as to move the pivot-blocks 49 and change the fulcrum of the levers 33 and 34, as will be readily understood.

I claim as my invention—

1. In a fertilizer-distributer, in combination, a hopper, running-gear upon which the hopper is mounted, an apron forming the bottom of the hopper, a pair of cams driven from the running-gear of the hopper, a pair of oppositely-movable ratchet-wheels, a gear to which the ratchet-wheels are fixed, connection between the gear and the apron for driving the latter, oppositely-moving levers operated by the cams, a pawl pivoted to each lever for intermittently driving one of the ratchet-wheels, a second pawl pivoted to each of the levers for intermittently driving the other ratchet-wheel, and means for disengaging either of said sets of pawls from its ratchet-wheel.

2. In a fertilizer-distributer, in combination, a hopper, running-gear upon which the hopper is mounted, a traveling apron forming the bottom of the hopper, a pair of oppositely-movable ratchet-wheels, a gear to which the ratchet-wheels are fixed, connection between the gear and the apron for driving the latter, oppositely-moving levers, means for changing the fulcrum of said levers, a pair of pawls one of which is pivoted to each lever for intermittently driving one of the ratchet-wheels, a second pair of pawls one of which is pivoted to each lever for engaging the other ratchet-wheel, an operating-lever, and connection between each pair of pawls and the operating-lever.

3. In a fertilizer-distributer, in combination, a hopper, running-gear upon which the hopper is mounted, a traveling apron forming the bottom of the hopper, a pair of oppositely-movable ratchet-wheels, a gear to which the ratchet-wheels are fixed, connection between the gear and the apron for driving the latter, oppositely-moving levers driven from the running-gear of the hopper, a pair of pawls, one of which is pivoted to each lever, for intermittently driving one of the ratchet-wheels, a second pair of pawls pivoted to the levers and engaging the other ratchet-wheel, sliding blocks upon which the levers are pivoted, means for sliding the said blocks, an operating-lever, connection between each pair of pawls and the operating-lever.

4. In a fertilizer-distributer, in combination, a hopper, running-gear upon which the hopper is mounted, a traveling apron forming the bottom of the hopper, a pair of oppositely-movable ratchet-wheels, a gear to which the ratchet-wheels are fixed, connection between the gear and the apron for driving the latter, a pair of non-synchronously-moving levers, two sets of pawls carried by the levers each of which sets is adapted to impart motion to one of the ratchet-wheels, a lever for throwing the two sets of pawls into action in alternation or entirely out of action, connection between the lever and the pawls, a trip carried at each end of the apron, and a connection operated by the trip for throwing the lever.

5. In a fertilizer-distributer, in combination, a hopper, a traveling apron forming the bottom of the hopper, means for driving the apron, a distributer, means for driving the distributer, and automatic means for arresting the movement of the distributer and the apron independently of each other.

6. In a fertilizer-distributer, in combination, a hopper, a traveling apron forming the bottom of the hopper, operative connection for driving the apron, a distributer, operative connection for driving the distributer, and trips carried by the apron for rendering the said connections inoperative, independently of each other.

7. In a fertilizer-distributer, in combination, a hopper, a traveling apron forming the bottom of the hopper, running-gear upon which the hopper is mounted, connection between the running-gear and the apron for driving the latter in either direction, a trip at each end of the apron for throwing the connection out of operation, a distributing-drum, connection between the running-gear and the distributing-drum, a clutch in said connection, and a trip at each end of the apron for coupling and uncoupling the clutch in alternation.

8. In a fertilizer-distributer, in combination, a hopper, running-gear upon which the hopper is mounted, a traveling apron forming the bottom of the hopper, a pair of levers operated from the running-gear, pawl-and-ratchet connection between the levers and the apron, means for reversing the action of the pawl-and-ratchet mechanism, manually-controlled means for throwing the pawls out of action, a rotatable distributing-drum, connection between the drum and the running-gear, manually-controlled means for rendering the said connection inoperative, and automatic means for throwing the distributing-drum into or out of operation.

9. A distributing-drum for fertilizer-distributers, in combination, a shaft, a pair of heads or webs fixed to the shaft and provided with radial lugs, angle-bars secured to the lugs and connecting the heads or webs, and fingers or pickers fastened to the angle-bars.

10. In a fertilizer-distributer, in combination, a hopper, an apron forming the bottom of the hopper, a ratchet-wheel for imparting movement to the apron, a pair of non-synchronously-moving levers carrying pawls for driving the ratchet-wheel and having longitudinal slots, a pivot upon which the levers are mounted and slidable in the said slots, and means for moving the pivot.

11. In a fertilizer-distributer, in combination, a hopper, an apron forming the bottom of the hopper, a ratchet-wheel for imparting movement to the apron, a pair of non-synchronously-moving levers carrying pawls for driving the ratchet-wheel and provided with longitudinal slots, pivot-blocks located in the slots and upon which the levers are mounted, a slidable pin carrying the blocks, and means for sliding the pin.

12. In a fertilizer-distributer, in combination, a hopper, an apron forming the bottom of the hopper, a pair of oppositely-moving ratchet-wheels for imparting motion to the apron, a pair of non-synchronously-moving levers, two sets of pawls carried by the levers and each of which sets is adapted to impart motion to one of the ratchet-wheels, a medially-pivoted hand-lever, rods connecting the sets of pawls with the lever at opposite sides of the pivot, a clutch for holding the lever in its adjusted position, and spring connection between the lever and the connecting-rods.

ERNEST C. SMITH.

Witnesses:
J. B. CASTLE,
J. M. HUMMEL.